(12) United States Patent
Balazich et al.

(10) Patent No.: US 7,478,185 B2
(45) Date of Patent: Jan. 13, 2009

(54) DIRECTLY INITIATING BY EXTERNAL ADAPTERS THE SETTING OF INTERRUPTION INITIATIVES

(75) Inventors: Douglas G. Balazich, Poughkeepsie, NY (US); Michael D. Campbell, Hyde Park, NY (US); Janet R. Easton, Woodstock, NY (US); Mark S. Farrell, Pleasant Valley, NY (US); Thomas A. Gregg, Highland, NY (US); Kulwant M. Pandey, Lagrangeville, NY (US); Gary E. Strait, LaGrange, NY (US); Charles F. Webb, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/620,141

(22) Filed: Jan. 5, 2007

(65) Prior Publication Data
US 2008/0168202 A1 Jul. 10, 2008

(51) Int. Cl.
*G06F 13/24* (2006.01)
(52) U.S. Cl. ........................ 710/262; 710/266
(58) Field of Classification Search ............... 710/48, 710/49, 260, 262, 263, 266, 267, 268, 269
See application file for complete search history.

(56) References Cited

U.S. PATENT DOCUMENTS

| | | | | |
|---|---|---|---|---|
| 4,271,468 A | | 6/1981 | Christensen et al. | 364/200 |
| 4,644,465 A | | 2/1987 | Imamura | 364/200 |
| 4,887,202 A | | 12/1989 | Tanaka et al. | 364/200 |
| 5,125,093 A | * | 6/1992 | McFarland | 710/266 |
| 5,222,215 A | | 6/1993 | Chou et al. | 395/275 |
| 5,507,032 A | * | 4/1996 | Kimura | 710/6 |
| 5,819,095 A | * | 10/1998 | Capps et al. | 710/260 |
| 6,185,639 B1 | | 2/2001 | Kailash et al. | 710/48 |
| 6,880,021 B2 | * | 4/2005 | Easton et al. | 710/5 |
| 2003/0061377 A1 | | 3/2003 | Gregg et al. | 709/238 |
| 2004/0230712 A1 | | 11/2004 | Belmar et al. | 710/15 |

* cited by examiner

*Primary Examiner*—Khanh Dang
(74) *Attorney, Agent, or Firm*—John E. Campbell; Blanche E. Schiller, Esq.; Heslin Rothenberg Farley & Mesiti, P.C.

(57) ABSTRACT

The setting of interruption initiatives is directly initiated by external adapters. An adapter external to the processors at which the initiative is to be made pending sends a request directly to a system controller coupled to the adapter and the processors. The system controller then broadcasts a command to the processors instructing the processors to set the interruption initiative.

9 Claims, 6 Drawing Sheets fig. 1 fig. 2 fig. 3 fig. 4 fig. 5 fig. 6 fig. 7

DIRECTLY INITIATING BY EXTERNAL ADAPTERS THE SETTING OF INTERRUPTION INITIATIVES

TECHNICAL FIELD

This invention relates, in general, to input/output (I/O) interrupt processing, and in particular, to initiating the setting of I/O interruption initiatives by external adapters.

BACKGROUND OF THE INVENTION

Interruptions are used to alert processors that action is to be taken. There are different types of interruptions, including input/output (I/O) interruptions, which are initiated by I/O components of a processing environment. For example, adapters external, but coupled to, a central processing complex initiate I/O interruptions for processors of the central processing complex.

In some processing environments, including one or more of those in which the central processing complex is based on the z/Architecture offered by International Business Machines Corporation, an I/O interruption initiated by an external adapter is first seen as an Alert attention to a processor of the environment. That Alert attention is processed by firmware to determine whether an initiative is to be set. This determination requires communication between different firmware components and communication between firmware and the adapter.

Should it be determined that the initiative is to be set, then the processor sets the initiative in an Interruption Queue Header (IQH) under control of a lock. When the queue transitions from the empty to the non-empty state, the processor broadcasts a command to all of the processors of the environment instructing the processors to set the initiative at the processors. Each processor sets a bit in a pending interruption array of that processor.

When a processor is enabled for an I/O interruption that is made pending, an attempt is made to handle the interruption. Since multiple processors can be enabled for the same interruption, a race condition exists. Arbitration for the interruption is performed by the hardware, and one processor will be chosen to be in control of the initiative for that interruption.

SUMMARY OF THE INVENTION

Although techniques exist for setting I/O interruption initiatives by external adapters, a need still exists for a capability to enable the external adapters to directly initiate the setting of the I/O interruption. For example, a need exists for an external adapter to be able to directly initiate the setting of an I/O interruption, thus eliminating the Alert attention and associated firmware processing.

The shortcomings of the prior art are overcome and additional advantages are provided through the provision of a method of initiating the setting of interruption initiatives within a processing environment. The method includes, for instance, directly initiating by an adapter external to at least one processor of the processing environment a setting of an interruption initiative at one or more processors of the processing environment, wherein the directly initiating is absent use of firmware of the processing environment.

Article of manufacture and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, an adapter external to one or more processors of a processing environment is able to directly initiate the setting of an interruption initiative, such as an I/O interruption initiative, at one or more of the processors. As one example, the adapter directly sends a request to a system controller (e.g., hardware) coupled to the adapter and the processors. The request designates a particular zone and I/O interruption subclass within the processing environment for which a pending interruption is to be set. The system controller builds a command based on the request and sends the command to one or more processors (e.g., the processors coupled to the system controller).

In response to a processor receiving the command, the processor sets one or more pending interruption array indicators. For instance, each processor sets an indicator in a pending interruption array and a filter pending interruption array of its processor for the zone and interruption subclass designated in the command. By allowing the adapter to issue the command directly, the Alert attention and associated firmware processing previously needed is eliminated.

Figure 1:
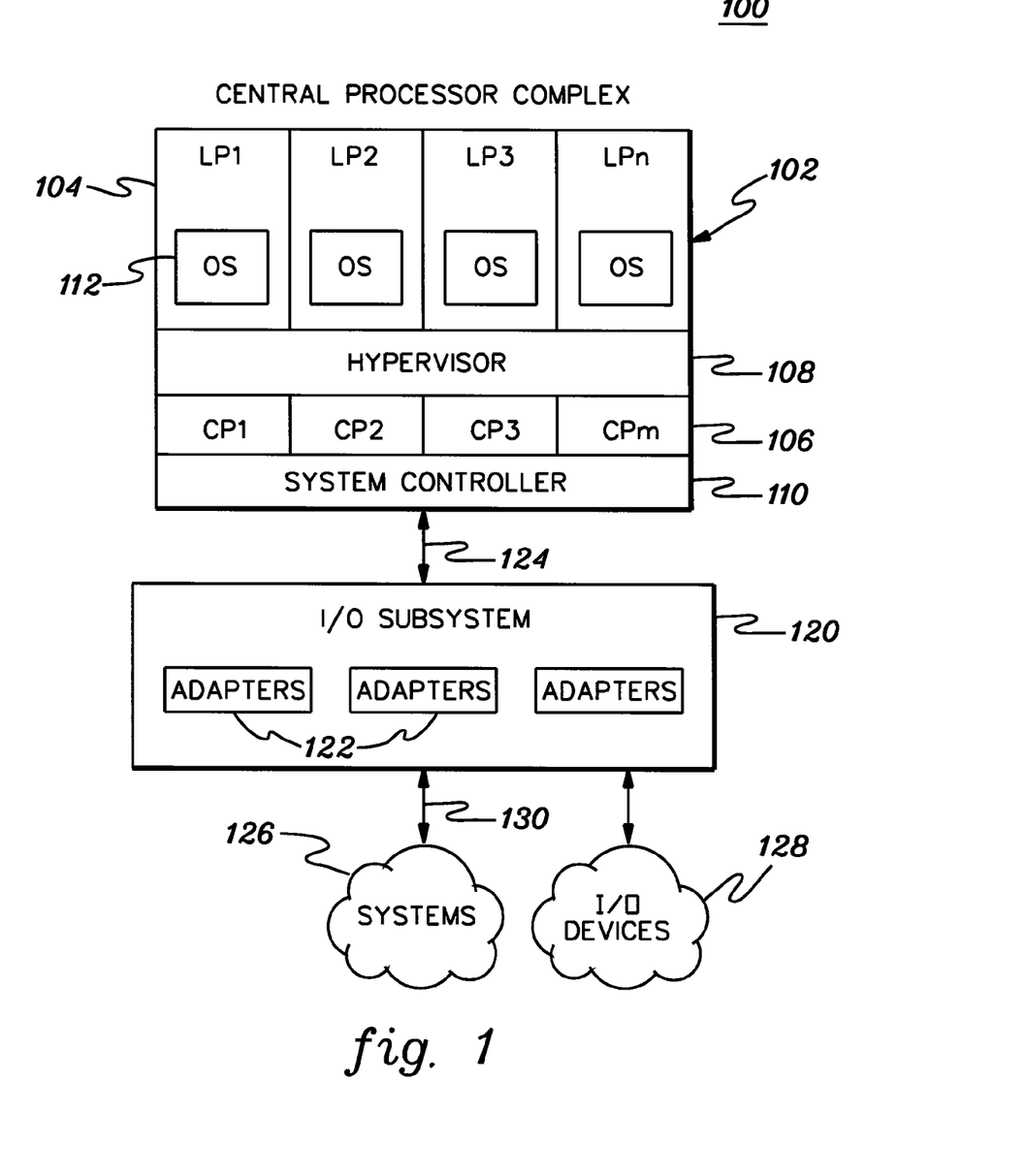
FIG. 1 depicts one embodiment of a processing environment to incorporate and use one or more aspects of the present invention.

One embodiment of a processing environment to incorporate and use one or more aspects of the present invention is described with reference to FIG. 1. A processing environment 100 is based, for instance, on the z/Architecture offered by International Business Machines Corporation, Armonk, N.Y. The z/Architecture is described in an IBM® publication entitled, "z/Architecture Principles of Operation," IBM Publication No. SA22-7832-04, September 2005, which is hereby incorporated herein by reference in its entirety. In one example, a processing environment based on the z/Architecture includes an eServer zSeries® server, offered by International Business Machines Corporation, Armonk, N.Y. (IBM® and zSeries®, as well as z/OS® mentioned below, are registered trademarks of International Business Machines Corporation, Armonk, N.Y., U.S.A. Other names used herein may be registered trademarks, trademarks or product names of International Business Machines Corporation or other companies.)

As one example, processing environment 100 includes a central processor complex (CPC) 102 coupled to an input/output (I/O) subsystem 120. Central processor complex 102 includes, for instance, one or more partitions 104 (e.g., logical partitions LP1-LPn), one or more central processors 106 (e.g., CP1-CPm), a hypervisor 108 (e.g., a logical partition manager) and a system controller 110, each of which is described below.

Each logical partition 104 is capable of functioning as a separate system. That is, each logical partition can be independently reset, initially loaded with an operating system, if desired, and operate with different programs. An operating system or application program running in a logical partition appears to have access to a full and complete system, but in reality, only a portion of it is available. A combination of hardware and firmware keeps a program in a logical partition from interfering with a program in a different logical partition. This allows several different logical partitions to operate on a single processor or multiple physical processors in a time sliced manner.

In this particular example, each logical partition has a resident operating system 112, which may differ from one or more logical partitions. In one embodiment, operating system 112 is the z/OS® operating system, offered by International Business Machines Corporation, Armonk, N.Y. Further, in this example, each logical partition has assigned thereto a portion of system main storage (memory), which is referred to as a zone.

A logical partition 104 includes one ore more logical processors. Each central processor 106 may be permanently allocated to a particular logical processor, or may be in a pool of central processors 106 available for dynamic allocation to any group of logical processors, possibly spanning multiple logical partitions 104.

Logical partitions 104 are managed by hypervisor 108 implemented by firmware running on processors 106. Logical partitions 104 and hypervisor 108 each comprise one or more programs residing in respective portions of central storage associated with the central processors. One example of hypervisor 108 is the Processor Resource/Systems Manager (PR/SM), offered by International Business Machines Corporation, Armonk, N.Y.

Central processors 106 are coupled to, but separate from, system controller 110. System controller 110 is, for instance, a hardware component that controls access to memory and caches within the processors, and communicates between the processors and input/output subsystem 120. The system controller is responsible for the queuing, serialization and execution of requests made by the central processing units and the I/O subsystem. In one example, it is responsible for sending commands to particular processors and/or broadcasting commands to multiple processors. The system controller may be a centralized component or its functions may be distributed. The system controller is not a processor or core. For example, it does not execute user applications. Instead, it is the communications mechanism between the I/O subsystem and the processors.

In accordance with an aspect of the present invention, system controller 110 directly receives requests from the I/O subsystem and broadcasts commands based on those requests to the processors coupled to the system controller. Specifically, in one embodiment, I/O subsystem 120 includes one or more adapters 122, which forward requests directly to the system controller. These requests initiate the setting of interruption initiatives at the processors. In response to receiving the requests, the system controller broadcasts commands based on those requests to the processors, which in turn set the interruption initiatives at their respective processors.

The I/O subsystem is coupled to the system controller via one or more buses 124, as an example. Further, the I/O subsystem is coupled to other systems 126 (e.g., other CPCs, etc.) and/or I/O devices 128 (e.g., control units, input devices, printers, other output devices, etc.) via one or more links 130. As examples, the links include Ethernet, Infiniband® and/or Fibre Channel links. Infiniband® is a registered trademark of the Infiniband Trade Association.

The adapters of the I/O subsystem transform the protocol of the system controller to the protocols of the links (and vice versa) to allow efficient communication between the central processing complex and other systems and/or I/O devices. An adapter receives packets over links 130, and in response thereto, may determine that an interruption initiative is to be set pending at the processors of the processing environment. When an interruption initiative is to be set, the adapter directly sends a request to the system controller, and the system controller instructs the processors to set the pending interruption initiatives. These initiatives are set by setting indicators in a pending interruption array and a filter pending interruption array described with reference to FIGS. 2-3.

Figure 2:
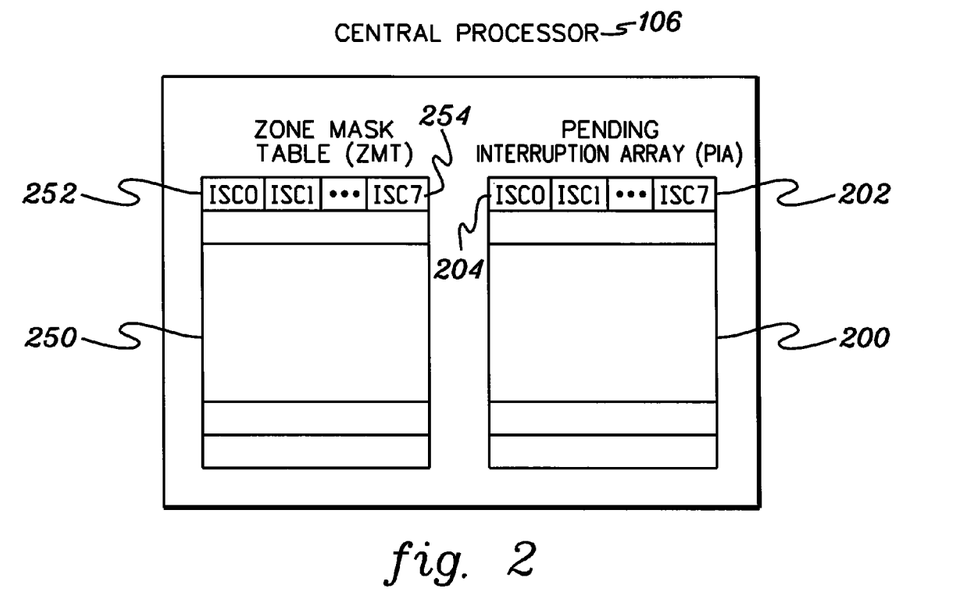
FIG. 2 depicts one embodiment of a zone mask table and a pending interrupt array used in accordance with an aspect of the present invention.

Referring initially to FIG. 2, a pending interruption array (PIA) 200 is a hardware component residing in a central processor 106. It includes an entry (e.g., a row) 202 for each zone (e.g., memory assigned to a logical partition) within the processing environment. In one example, the processing environment includes 64 zones, and therefore, there are 64 entries in the pending interruption array. Each entry includes an indicator 204 for each I/O interruption subclass (ISC) associated with the zone. An interruption subclass represents one of a plurality of possible subclasses of interruption, and in one example, there are eight interruption subclasses. Therefore, there are eight indicators in each entry, in this example. Each interruption subclass is associated with one or more sources of the interruption. When a bit is turned on in the pending interruption array, it indicates that an interruption is pending for that particular interruption subclass of that zone (i.e., ZONE.ISC).

Each interruption subclass (e.g., ISC0-ISC7) has a corresponding I/O interruption queue that holds one or more pending interruptions. The I/O interruption queues (e.g., 8 in this example) are located within system memory (e.g., the hardware system area), and each has an interruption queue header (IQH) associated therewith. The interruption queue header includes the initiatives made pending.

To handle an interruption made pending, a zone mask table (ZMT) 250 is employed. The zone mask table also has an entry 252 for each zone of the processing complex and an indicator 254 for each interruption subclass of each zone. The use of the zone mask table and further details associated with the pending interruption array are described in U.S. Pat. No. 5,222,215 entitled "CPU Expansive Gradation of I/O Interruption Subclass Recognition," Chou et al., issued on Jun. 22, 1993, which is hereby incorporated herein by reference in its entirety.

In accordance with an aspect of the present invention, another pending interruption array (referred to herein as a filter pending interruption array or Filter PIA) is employed.

Figure 3:
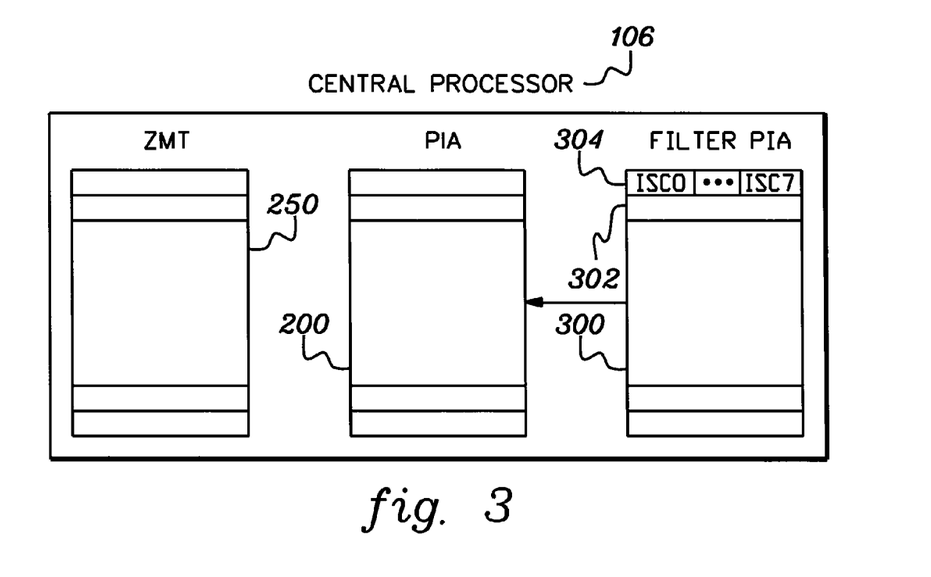
FIG. 3 depicts one embodiment of a filter pending interruption array used in accordance with an aspect of the present invention.

Referring to FIG. 3, a Filter PIA 300 is a hardware array that includes the same number of entries 302 and indicators 304 as the pending interruption array. That is, Filter PIA 300 includes an entry 302 for each entry 202 in PIA 200 and an indicator 304 for each indicator 204 of PIA 200. The Filter PIA acts as a hardware filter to the pending interruption array. It enables control to be maintained over setting the indicators, while allowing adapters to directly initiate the setting of the indicators.

Figure 5:
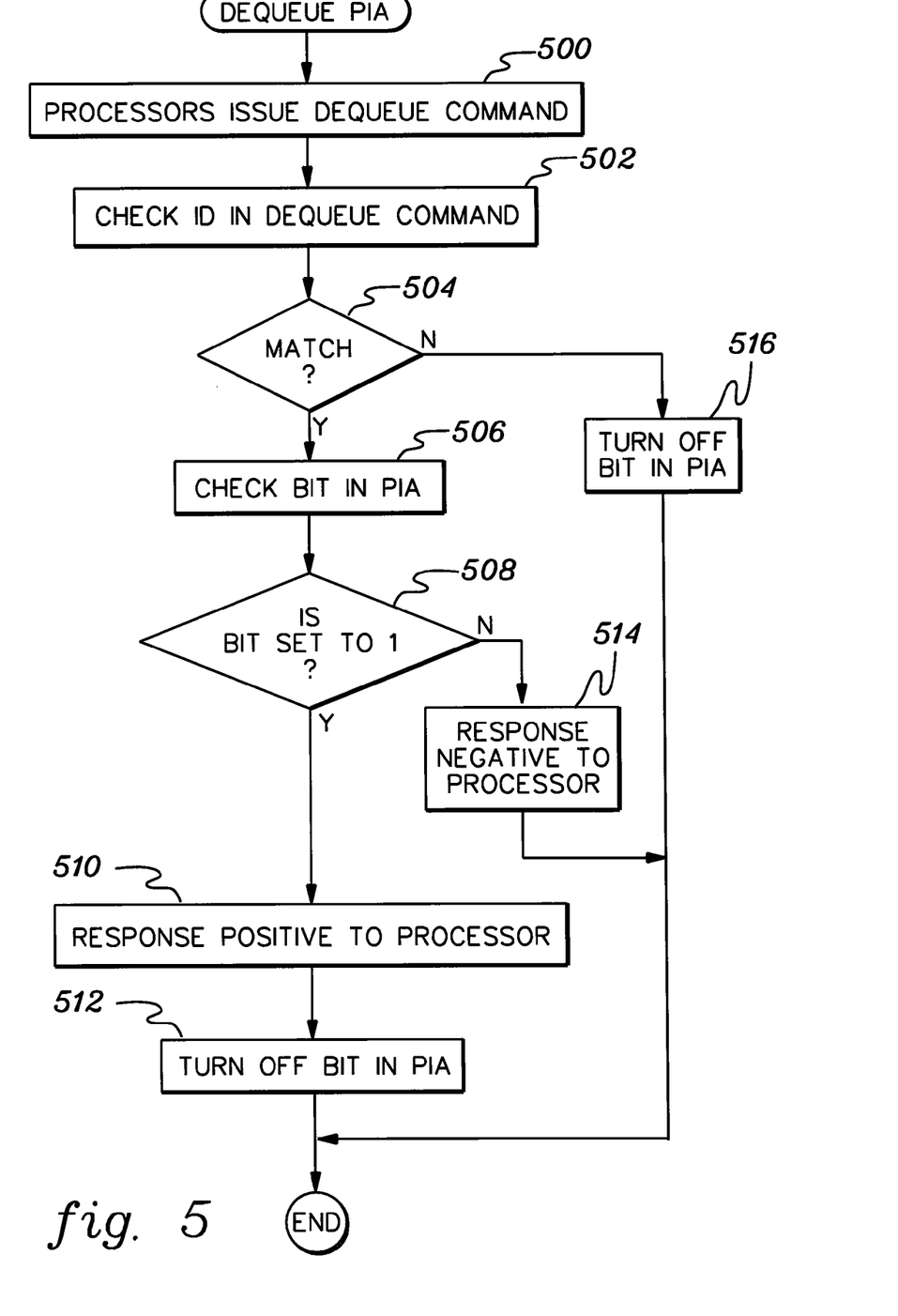
FIG. 5 depicts one embodiment of the logic associated with resetting an indicator of the pending interruption array, in accordance with an aspect of the present invention.
Figure 6:
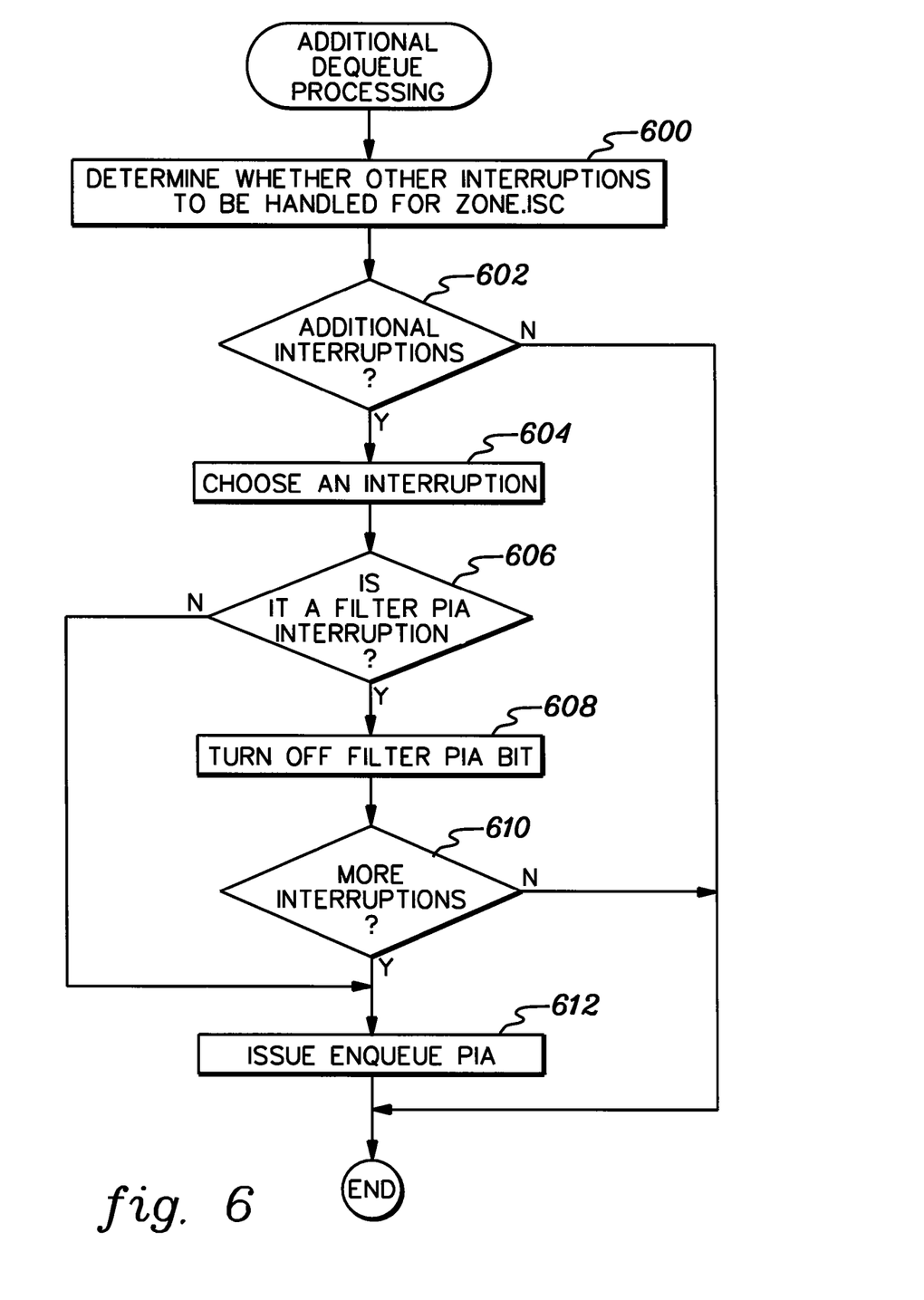
FIG. 6 depicts one embodiment of the logic associated with resetting an indicator of the filter pending interruption array, in accordance with an aspect of the present invention.

Use of the Filter PIA is described in further detail with reference to FIGS. 4-6. In particular, FIG. 4 describes one embodiment of the logic associated with setting the indicators, and FIGS. 5-6 depict one embodiment of the logic associated with resetting the indicators.

Figure 4:
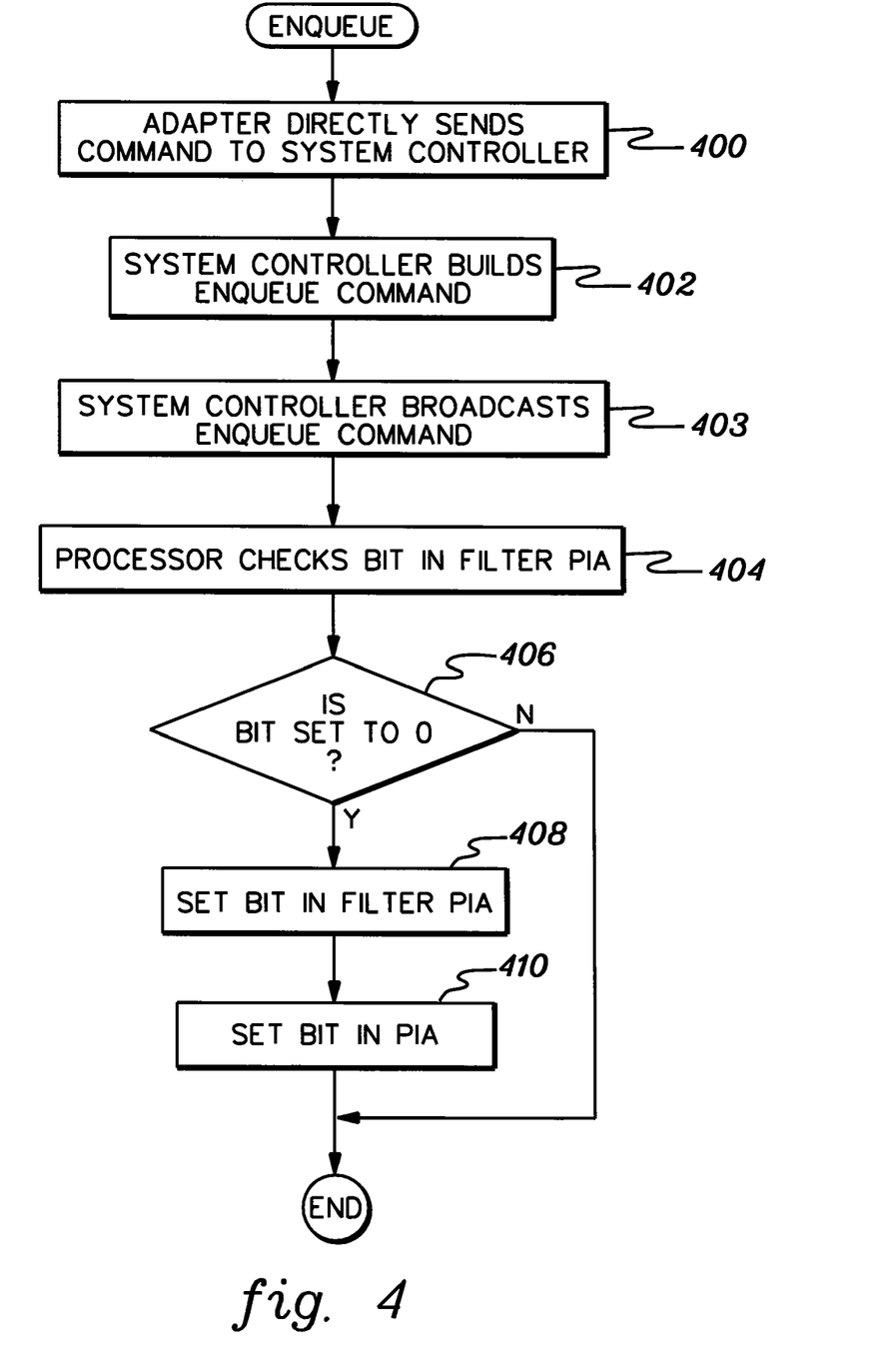
FIG. 4 depicts one embodiment of the logic associated with setting indicators in the pending interruption array and the filter pending interruption array, in accordance with an aspect of the present invention.

Referring to FIG. 4, initially, an adapter, which is external to the processors of the CPC, and therefore, referred to as an external adapter, issues an interruption request that is directly sent from the adapter to the system controller, STEP 400. This interruption request may be in response to a packet received by the adapter. The packet is from a source, associated with an interruption subclass, and destined for a particular logical partition associated with a zone. Thus, the adapter initiates setting of an interruption pending for that zone, and in particular, the interruption subclass of that zone (i.e., ZONE.ISC). The request sent to the system controller includes the ZONE.ISC, as well as an indication of the type of request. The adapter sends the request directly to the system controller without having to first send it to a processor for processing, as previously required.

The system controller receives the request and builds an enqueue command, referred to herein as a Filter SIGI enqueue command, based on the request, STEP 402. For instance, based on the indicator in the request, the system controller knows that the request is an interruption request for which a Filter SIGI enqueue command is to be built. The system controller retrieves the zone and ISC from the request and includes it in the command, along with a subcommand indicating that a Filter PIA enqueue is to be processed by the processors.

The system controller broadcasts the built enqueue command to all the processors coupled to the system controller, STEP 403. In another embodiment, the enqueue command is sent to one or more of the processors.

In response to a processor receiving the Filter PIA enqueue command, a processor checks the indicator (e.g., a bit) in the Filter PIA corresponding to the ZONE.ISC specified in the command, STEP 404. If the bit is set to zero, indicating that another processor has not set the pending interruption, INQUIRY 406, then the bit is set to one, in one example, in the Filter PIA, STEP 408. Further, the corresponding bit is set in the PIA, STEP 410. This concludes enqueue processing.

Returning to INQUIRY 406, if the bit is already set, then enqueue processing is complete for this processor.

The above processing allows the adapter to directly initiate a setting of an interruption initiative at one or more processors. The Filter PIA works as a filtering mechanism and aggregates the interruptions in one place to prevent uncontrolled updates of the PIA and to prevent interference with the I/O interruption arbitration mechanism.

One or more processors are enabled to handle the interruption, as described in U.S. Pat. No. 5,222,215 entitled "CPU Expansive Gradation of I/O Interruption Subclass Recognition," Chou et al., issued on Jun. 22, 1993, which is hereby incorporated herein by reference in its entirety. The processors that are enabled arbitrate to handle the interruption, such that only one processor gains control of an interruption for the same ZONE.ISC at one time. Arbitration processing is described with reference to FIGS. 5-6.

Referring to FIG. 5, each processor that is enabled for the interruption issues a dequeue command, referred to herein as a SIGI dequeue command, STEP 500. The dequeue command includes the source processor identifier, i.e., the identifier of the processor issuing the dequeue command, as well as the ZONE.ISC. This command is broadcast to all of the processors.

In response to a processor receiving the command, the processor checks the processor id in the dequeue command, STEP 502. If the processor id in the dequeue command matches the processor id of the processor processing the command, INQUIRY 504, then the processor may have won the arbitration to handle the interruption. Thus, the processor checks the indicator (e.g., bit) in the processor's pending interruption array (PIA) corresponding to the zone and ISC specified in the dequeue command, STEP 506. If the indicator is set to one, INQUIRY 508, then the processor sets a hardware condition sensible by firmware on that processor to indicate a response positive signifying that the processor has priority to the interruption, STEP 510. Further, the processor turns off the indicator in the PIA, STEP 512.

Returning to INQUIRY 508, if the indicator is not set to one, then the processor sets a hardware condition sensible by firmware indicating a response negative. This indicates that another processor has won the arbitration to handle the interruption.

Returning to INQUIRY 504, if the processor id does not match the identifier in the dequeue command, then the processor turns off the bit in the PIA, STEP 516, and processing concludes.

In addition to resetting the PIA bit, the Filter PIA bit needs to be reset, when appropriate. This processing is described with reference to FIG. 6. In one example, this processing is performed by the processor that won the arbitration and gained control over the interruption processing of the ZONE. ISC.

Referring to FIG. 6, initially, a determination is made as to whether other interruptions are to be handled for this particular ZONE.ISC, STEP 600. In one example, this determination is made by checking the interruption queue header (IQH) to determine if there are other interruptions queued for this ZONE.ISC, and by checking the filter PIA indicator for this ZONE.ISC. In one example, hardware is provided to query the Filter PIA for a particular ZONE.ISC to determine if the indicator is on for that ZONE. ISC.

If there are either interruptions on the interruption queue header or there is an indication of a filter pending interruption, INQUIRY 602, then an interruption is chosen, STEP 604. In one example, the interruption to be handled is chosen based on a fairness technique. For instance, if a conventional interruption pending (i.e., one on the IQH) was previously handled, then a filter pending interruption is handled at this time. Other techniques may also be used.

Next, a determination is made as to whether a filter PIA interruption was chosen, INQUIRY 606. If a filter PIA was the interruption of choice, then the filter pending interruption bit is reset, STEP 608, and a further determination is made as to whether there are additional interruptions to be handled, INQUIRY 610. If there are further interruptions to be handled, then an enqueue PIA command is issued, STEP 612. This enqueue command makes an interruption pending to allow a processor to handle the additional interruptions.

Returning to INQUIRIES 602 and 610, if there are no additional interruptions, then processing is complete. Further, returning to INQUIRY 606, if the chosen interruption was not a filter PIA interruption, then an enqueue PIA command is issued to allow a processor to handle the interruption, STEP 612.

By using the above dequeue mechanism, it is guaranteed that only one processor handles a particular interruption at any point in time.

Described in detail above is a capability for directly setting by an external adapter an I/O interruption initiative at one or more processors. This capability eliminates the need for firmware (e.g., millicode and/or system code) processing to initiate the setting of the I/O interruption initiative.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 7:
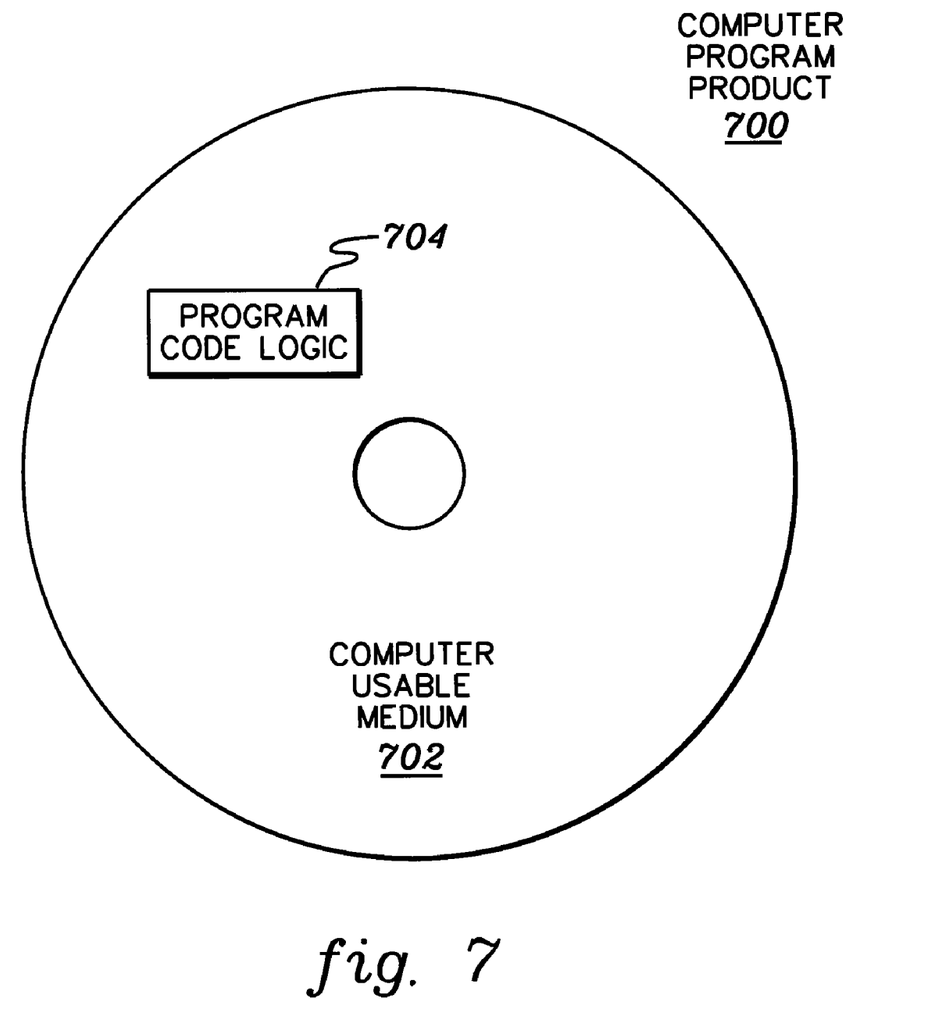
FIG. 7 depicts one embodiment of a computer program product incorporating one or more aspects of the present invention.

One example of an article of manufacture or a computer program product incorporating one or more aspects of the present invention is described with reference to FIG. 7. A computer program product 700 includes, for instance, one or more computer usable media 702 to store computer readable program code means or logic 704 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided for enabling an external I/O component, such as an adapter, to directly set an I/O interruption initiative at one or more processors, thus avoiding the overhead of the external Alert attention and the associated firmware processing that is normally needed to serialize and set the I/O interruption initiative. With this capability, an adapter, such as a host channel adapter, sends a request directly to a system controller that is coupled to the I/O subsystem and processors of the processing environment. In turn, the system controller broadcasts a SIGI enqueue command that instructs the processors receiving the command to set an initiative in the PIA and Filter PIA of the processors. This eliminates the Alert attention and associated firmware attention processing layer.

Since the adapter is not locking the interruption queue header and several adapters could issue a SIGI enqueue for the same ZONE.ISC, a mechanism is also provided to prevent interference with the I/O interruption arbitration mechanism. The mechanism controls the performance implication of allowing multiple processors to handle an interruption for the same ZONE.ISC that would result from the SIGI enqueue traffic that the adapter would produce. This mechanism includes a hardware filter, referred to as a Filter PIA.

The Filter PIA provides aggregation of the hardware generated interruption initiatives from the adapters to prevent uncontrolled updates of the PIA and to prevent interference with the normal I/O interruption arbitration mechanism. Although in the dequeue processing, the filter PIA indicators are handled in an aggregate manner, in another embodiment, there can be multiple interruptions pending for a particular ZONE.ISC in the Filter PIA and each one can be handled independently.

As used herein, obtaining by a system controller, includes receiving, fetching, having, being provided, etc.

Although various embodiments are described above, these are only examples. For instance, a processing environment other than the one described herein may incorporate and/or use one or more aspects of the present invention. As an example, the central processing complex may include more, less or different components. For instance, a processing complex may include one or more processors and a system controller, and may or may not be logically partitioned.

As further examples, the processors may be based on architectures other than the z/Architecture, offered by International Business Machines Corporation, and each logical partition may execute operating systems that differ from the z/OS® operating system. Further, the I/O subsystem may include different components than described herein, including different types of adapters or other types of I/O components that receive requests and may want to initiate I/O interruptions. Further, the processing environment may include more or less zones than the 64 zones used in the examples herein, and there may be more or less than eight interruption subclasses. Moreover, a system controller can be different from the example described herein. For instance, it can have different functionality and/or it may be implemented in software, firmware, hardware or a combination thereof. There are many other variations that may be included and are a part of the invention as claimed herein.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail there, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of initiating the setting of interruption initiatives within a processing environment, said processing environment comprising at least one processor, and said method comprising:
   directly initiating by an adapter external to the at least one processor of the processing environment a setting of an interruption initiative at one or more processors of the processing environment, wherein the directly initiating is absent use of firmware of the processing environment, wherein the directly initiating comprises sending a request directly from the adapter to a system controller that is coupled to the adapter and to the one or more processors;
   forwarding a command based on the request from said system controller to the one or more processors to instruct the one or more processors to set the interruption initiative at the one or more processors;
   setting, by a processor of the one or more processors, the interruption initiative at the processor, wherein the setting comprises setting a filter indicator in a filter pending interruption array, and an indicator in a pending interruption array (PIA) of the processor; and
   wherein a zone mask table (ZMT) enables processor recognition and handling of an interruption made pending, the filter pending interruption array is a hardware filter controlling the setting of one or more corresponding indicators in the pending interruption array (PIA), and wherein the setting of an indicator in the filter pending interruption array prevents subsequent repeated setting of a corresponding indicator in the pending interruption array responsive to repeated requests from the adapter.

2. The method of claim 1, wherein the forwarding comprises broadcasting the command to the one or more processors of the processing environment coupled to the system controller.

3. The method of claim 1, further comprising resetting the interruption initiative at the one or more processors.

4. The method of claim 3, wherein the resetting is performed by one processor gaining control of the interruption processing, and wherein the resetting comprises at least one of:
   resetting the indicator in the pending interruption array; or
   resetting the filter indicator in the filter pending interruption array, in response to a determination that there are no interruptions to be handled for a zone and interruption subclass specified in the request.

5. The method of claim 4, wherein the resetting comprises resetting the indicator in the pending interruption array and the resetting is in response to a determination that a subsequent firmware initiated interrupt should be allowed to be made pending.

6. The method of claim 5, wherein the resetting further comprises resetting the filter indicator in the filter pending interruption array, and the resetting is responsive to a determination that a subsequent adapter initiated interrupt should be allowed to be made pending.

7. The method of claim 4, wherein the resetting comprises resetting the filter indicator in the filter pending interruption array, and the resetting is responsive to a determination that a subsequent adapter initiated interrupt should be allowed to be made pending.

8. The method of claim 4, further comprising determining whether a filter pending interruption is to be handled for the zone and interruption subclass, wherein the determining employs hardware to query the filter pending interruption array.

9. The method of claim 1, wherein the filter pending interruption array prevents subsequent repeated setting of the pending interruption array by the adapter, thereby preventing the adapter from interfering with an interruption arbitration mechanism of the processing environment.

* * * * *